April 20, 1965
C. W. MacMILLAN
3,178,945
BALANCER
Filed March 28, 1962
2 Sheets-Sheet 1
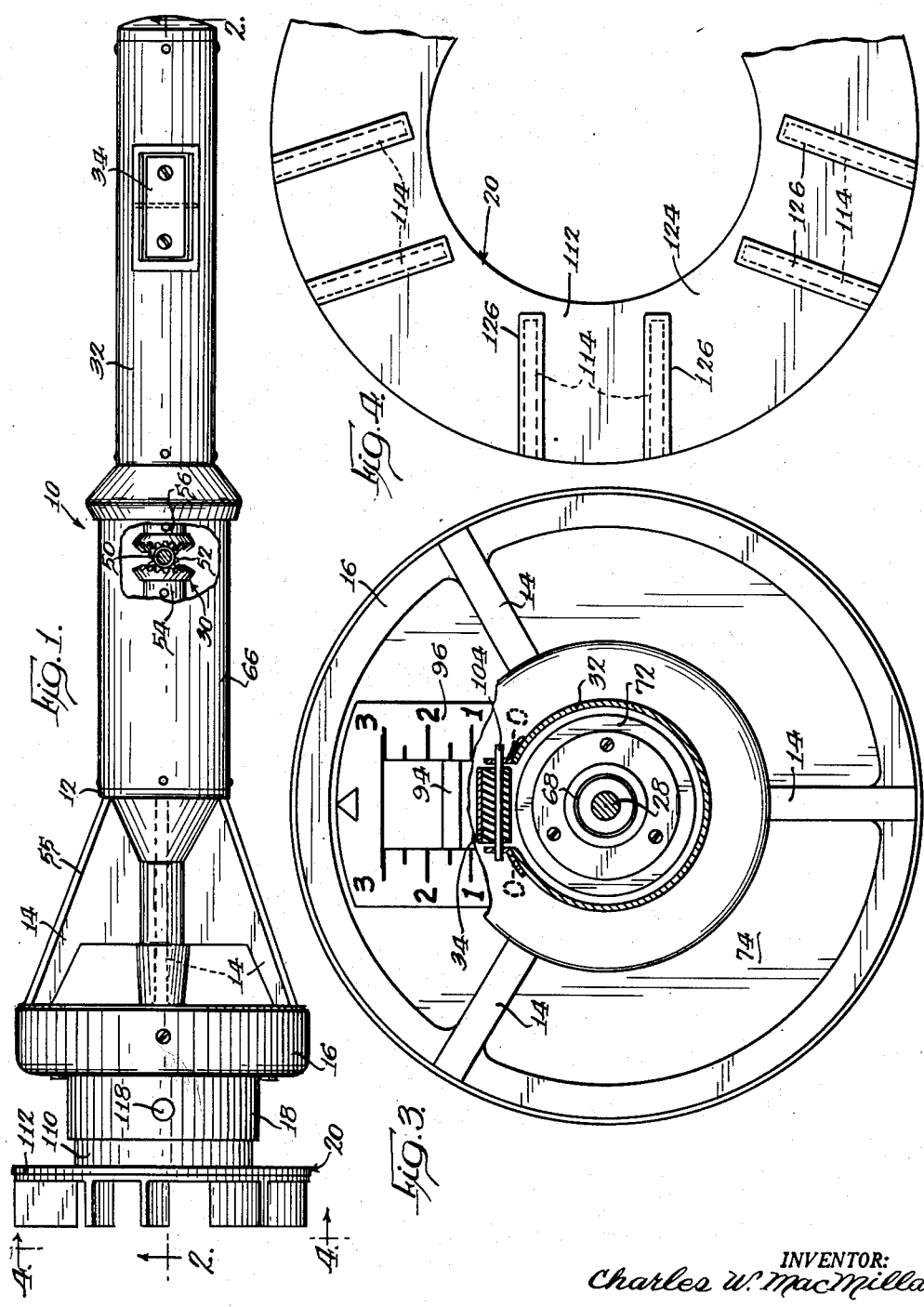
INVENTOR:
Charles W. MacMillan
BY
Dary, Desmond & Parker
Att'ys April 20, 1965
C. W. MacMILLAN
3,178,945
BALANCER
Filed March 28, 1962
2 Sheets-Sheet 2
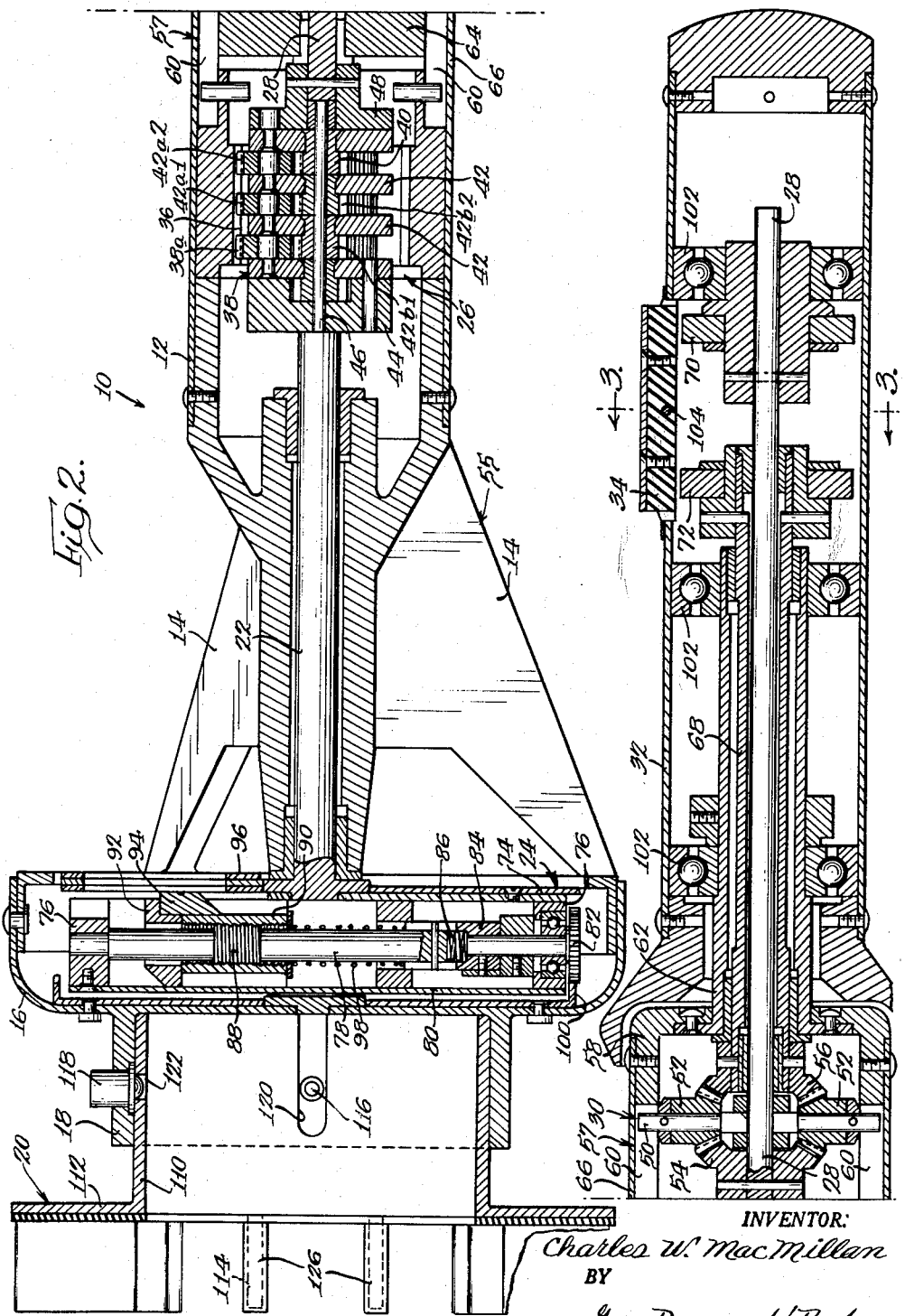
INVENTOR:
Charles W. MacMillan
BY
Gary, Desmond & Parker
Att'ys

United States Patent Office 3,178,945
Patented Apr. 20, 1965

3,178,945
BALANCER
Charles W. MacMillan, Rock Island, Ill., assignor to Bear Manufacturing Company, Rock Island, Ill., a corporation of Delaware
Filed Mar. 28, 1962, Ser. No. 183,112
16 Claims. (Cl. 73—458)

The present invention relates to apparatus for determining the position and amount of counterweight required to balance a rotating body; and is concerned particularly with improved apparatus for balancing the wheels of automotive vehicles.

Mechanical balancers generally consist of a first member adapted to be secured to the body to be tested for conjoint rotation with the body about a common axis, a second member journalled coaxially and normally rotated conjointly with the first, a counterweight assembly rotated conjointly with the second member and movable relative thereto for change in its counterbalancing effect, a first mechanical drive train for causing progressive and retrogressive rotary movement of the second member relative to the first to change the circumferential position of the counterweight, and a second mechanical drive train for moving the counterweight assembly to increase and decrease its counterbalancing effect. Indicating means are usually provided for indicating the position and amount of weight to be added to the test body, such as to the rim of an automobile wheel, to counterbalance the same.

In such mechanical balancers, four functions must be performed by the operator when balancing a test body, namely: (1) add weight; (2) subtract weight; (3) rotate weight in one direction; (4) rotate weight in the opposite direction. To facilitate performance of these functions, the balancer usually includes four axially projecting control knobs which normally rotate with the balancer and which are selectively stoppable by the operator to effect the respective control functions. In my Patent 2,972,256, I have shown a balancer wherein the four separate functions may be performed by appropriate manipulation of two axially shiftable knobs.

A recent development affords two marked improvements over balancers of the above described character. The first improvement resides in the concept of simultaneously adjusting both the counterbalancing effect and the circumferential position of the counterweight assembly through the medium of a single control. The result is simultaneous rotary progression or retrogression of said second member and increase or decrease in the counterbalancing effect to the counterweight, whereby the counterweight passes successively into and out of phase with the unbalance of the body until it attains an out-of-phase position counterbalancing such unbalance. The second improvement resides particularly in the provision of a balancer holding handle rotatably mounted relative to both said members and a drive plate adapted to be simply abutted against the test body and held there through the handle.

The first improvement greatly facilitates balancing by minimizing the operations and the skill required of the operator. In particular, as the counterweight moves in one circumferential direction relative to the body the counterbalancing effect is increased, and as the counterweight moves in the opposite circumferential direction the counterbalancing effect is decreased, whereby the operator may merely push a button one way or the other until vibration is at a minimum and balance is achieved.

The second improvement eliminates the need for secure attachment of the balancer to the wheel or other test body and thus eliminates the complex adapters heretofore required, the inherent time loss of such adapters and the dangers of the same flying off the test body or wheel. The operator may now simply hold the balancer in his hands and should the same become disengaged during operation no damage would be caused.

The aforesaid recent development however suffers certain shortcomings, not in concept or in principle and not in operativeness, but in the commercial practicality of the means proposed for accomplishment of the stated results. In particular, relative movement of the counterweight means was proposed to be accomplished by a reversible electric motor requiring a transformer, slip rings, etc., all of which are relatively expensive and are sources of possible trouble in the environment in which the device is to be used, i.e., service stations and garages.

The object of the present invention is to improve upon balancers of the recently developed character and to provide for economical production and long service life of the same.

One object of the present invention is to provide, in balancers of the stated character, mechanical means deriving power from the rotating test body for producing simultaneous change in the counterbalancing effect and position of the counterweight. It is also an object to provide such mechanical means of a rugged durable character and economical construction facilitating commercial production and long service life of the balancer.

Another object of the invention is to provide an improved balancer wherein said two members comprise concentric relatively rotatable shafts and the entirety of the mechanical drive means between the two is encased within the outer shaft to afford a compact economical balancer, and one particularly that may readily be hand-held by an operator in engagement with a rotating body.

A further object of the invention is the provision of improved means for establishing engagement between the balancer and the rotating test body.

Other objects and advantages of the invention will become apparent in the following detailed description.

Now, in order to acquaint those skilled in the art with the manner of making and using my improved balancing device, I shall describe, in connection with the accompanying drawings, a preferred embodiment of the balancer and the preferred manner of making and using the same.

In the drawings:

FIGURE 1 is a plan view of the device of the invention as embodied for the balancing of automotive wheels, a portion of the case of the balancer being broken away to reveal a reversing assembly therein;

FIGURE 2 is a longitudinal section of the balancer, the view being taken on an enlarged scale substantially on line 2—2 of FIGURE 1;

FIGURE 3 is a cross-section of the balancer taken substantially on line 3—3 of FIGURE 2 and showing the manual control means and the counterbalance indicating means thereof; and FIGURE 4 is a fragmentary front elevation of the means for establishing driving engagement between a wheel and the balancer.

Referring now to the drawings, the balancer of the present invention is shown as comprised of a first rotary assembly 10 including a tubular shaft 12, a plurality of circumferentially balanced divergent legs 14 at the forward end of said shaft, a generally cup-shaped counterweight enclosure 16 secured to said arms concentrically with the shaft and a tubular forward extension 18 on said enclosure; a wheel engaging adapter 20 detachably or releasably mounted on said extension; a second rotary assembly embodied within the first assembly and including a rotatable shaft 22 journalled coaxially in the tubular shaft, a counterweight assembly 24 secured to the shaft 22 and disposed within the enclosure 16, a change speed transmission 26 mounted within the tubular shaft 12 and including members secured respectively to the two shafts, a control shaft 28 journalled coaxially in the shaft 12, coupled in said transmission 26 and mounting elements of a reversing assembly 30 which is also mounted concentrically within the tubular shaft 12; and a handle 32 journalled on the assembly 10 and the control shaft 28 rearwardly of the reversing assembly 30 and carrying a manually actuated control instrumentality 34 for controlling the reversing assembly 30.

The tubular shaft 12 is adapted to be connected to a vehicle wheel through the legs 14, the enclosure 16 and the adapter 20 whereby said shaft will rotate conjointly with the wheel when the wheel is rotated in a manner conventional in the wheel balancing art. The shaft 12, through the intermediary of the change speed transmission 26 and the reversing assembly 30, normally drives the second shaft 22 and the counterweight assembly 24 conjointly therewith.

The change speed transmission 26 comprises a planetary gearing assembly including an orbital gear 36 fixed concentrically within or comprising part of the tubular shaft 12, a planet gear and carrier plate assembly 38 fixed coaxially to the inner or second shaft 22, a sum gear 40 secured axially to the control shaft 28, and a plurality of interposed units 42 each comprised of a sun gear, a carrier plate and a balanced assembly of planet gears. As shown in FIGURE 2, the shaft 22 preferably terminates in a cup-shaped fitting 44 having a bore therein for reception of a sun gear portion on the planet and carrier assembly 38 and mounting an axially extending journal shaft 46 for the interposed units 42. By providing a central recess or bore in the fitting 44, the assembly 38 may be made identical to the interposed units 42. In the case of the assembly 38, however, the same is pinned directly to the fitting 44 so that the sun gear entering into the member 44 performs no function in the transmission assembly. The planet gears $38a$ of the assembly 38 are meshed with the orbital gear 36 and with the sun gear $42b1$ of the first unit 42. The planet gears $42a1$ of the first interposed unit are in turn meshed with the orbital gear 36 and the sun gear $42b2$ of the second interposed unit 42. The planet gears $42a2$ of said second interposed unit 42 are meshed with the orbital gear 36 and the sun gear 40. The sun gear 40 is preferably formed integral with a carrier plate (whereby all of the gear units are identically constructed for purposes of economy) and this carrier plate is pinned to a fitting 48 for conjoint rotation therewith, the fitting 48 assisting the fitting 44 in supporting the journal shaft 46 and being pinned to the control shaft 28 for conjoint rotation therewith.

The reversing assembly 30 preferably comprises power input means including a shaft 50 extending perpendicular to the tubular shaft 12 and journalled thereon for rotation about its own axis. The shaft 50 in turn rotatably mounts a pair of opposed bevel gears 52 which are meshed with a second pair of opposed bevel gears rotatably mounted coaxially of shafts 12 and 22 and comprising an output gear 54 disposed adjacent the transmission 26 and a control gear 56 disposed adjacent the outer end of the shaft 12. The output gear 54 is pinned to the control shaft 28 for conjoint rotation therewith, and said shaft preferably extends axially through the gears 54 and 56 to provide a journal for the gear 56.

By virtue of the power input from the outer shaft 12 to the orbital gear 36 and the shaft 50 and the normal inertia or frictional resistance of the gears in the two assemblies, the outer or tubular shaft 12 normally drives the inner shaft 22 at a 1-to-1 speed ratio.

To facilitate mounting of the transmission and reversing assemblies within the tubular shaft 12, said shaft is preferably comprised of a forwardly disposed casting 55 including the legs 14, a reduced tubular extension through which the shaft 22 extends and an enlarged tubular end portion of a diameter corresponding to the outer diameter of the member defining the orbital gear 36. Rearwardly of the orbital gear, the tubular shaft is comprised of a member 57 that may be of either cup-shape or bifurcated fork or yoke construction, said member including a cup-like rearward end portion 58 and a pair of diametrically opposed slotted leg or wall portions 60. Fixedly secured to the portion 58 is a rearwardly projecting tubular extension 62, the purpose of which will be described in greater detail hereinafter. After assembly of the extension 62, the reversing assembly 30 may be mounted within the rear portion of the member 57 by sliding the shaft 50 into the same with the ends of the shaft riding in the slotted wall portions or legs 60, whereby the shaft is mounted on this member for conjoint rotation therewith. A bearing block 64 is then pressed into place between the slotted walls or legs to afford a bearing support for the forward end portion of the control shaft 28. The transmission assembly 26 may then be slid into place by causing pins on the orbital gear member 36 to engage slidably in the slotted wall or leg portions 60. If desired, the reversing assembly 30, the control shaft 28 and the transmission assembly 26 may be bench assembled as a unit for slidable insertion into the portion 57 of the tubular shaft 12. After assembly, the reversing mechanism and the transmission may be enclosed by a tubular sheet 66 which surrounds the slotted portion of the member 57 and is secured at its opposite ends to the cylindrical end 58 of said member and the enlarged tubular extension on the casting 55. As will be apparent to those skilled in the art, the fitting 44 facilitates connection between the transmission assembly 26 and the second or inner shaft 2.

The extension 62 of the rotatable outer shaft 12 forms a bearing support for rotatable passage therethrough of a tubular control shaft 68 which is pinned to the control gear 56 and which in turn forms a bearing support for the rotatable shaft 28. The shaft 68 extends rearwardly beyond the extension 62 and the shaft 28 extends rearwardly beyond the shaft 68, whereby the two control shafts 28 and 68 are exposed for individual engagement. On the rearward end portion thereof, each carries a relatively fixed disc or flange 70 and 72, respectively, facilitating manual engagement and stopping of the respective shaft.

Assuming the shaft 12 is rotating by virtue of engagement with a wheel under test, stopping of the disc 70 will result in stopping the control shaft 28, the output gear 54 and the sun gear 40. When the output gear 54 is stopped, the reversing assembly 30 will impart relative rotation to the control gear 56 and its shaft 68, but this has no operative effect on the assembly. Stopping of the sun gear 40, however, results in relative rotation between the sun gear 40 and the orbital gear 36 so that the planet gears $42a2$ of the second interposed unit 42 are required to rotate individually and bodily relative to both the sun gear and the orbital gear 36, whereby relative rotation is imparted to the sun gear $42b2$. Sun gear $42b2$ thus rotates, but at a speed significantly reduced from the speed of rotation of the orbital gear 36. Thus, the planet gears $42a1$ of the first interposed unit 42 rotate individually and bodily relative to the sun gear $42b2$ and the orbital gear 36 to cause rotation of the sun gear $42b1$. The sun gear $42b1$ will thus rotate faster than the sun gear $42b2$, but still not as fast as the orbital gear 36, so that the planet gears $38a$ are required to rotate individually and bodily relative to both the sun gear $42b1$ and the orbital gear 36 whereby the fitting 44 and the shaft 22 are rotated, but still at a speed less than the speed of rotation of the tubular shaft 12. In a relative sense then, the shaft 22 retrogresses relative to the shaft 12.

If the disc 70 were released and the disc 72 were manually engaged and stopped, this would result in stopping of the shaft 68 and the control gear 56. Upon stopping of the control gear 56 and with the shaft 50 orbiting about the axis of the shaft 12, the input gears 52 would be caused to rotate bodily and individually relative to the gear 56 thereby imparting rotary movement to the output gear 54. Assuming all of the gears of the reversing assembly have the same number of teeth and are of identical construction or substantially so, this will result in the output gear 54 being rotated at twice the speed of rotation of the tubular shaft 12. The rotation of the gear 54 is transmitted directly by the control shaft 28 to the sun gear 40, whereby the sun gear 40 is rotated at twice the speed of the orbital gear 36. This differential in speed will be reduced by the transmission assembly 26 in the same manner as previously described, whereby the shaft 22 is caused to rotate slightly faster than the tubular shaft 12. Consequently, the shaft 22 progresses relative to the shaft 12.

As the shaft 22 progresses or retrogresses relative to the tubular shaft 12, the counterweight assembly 24 rotates in one direction or the other relative to the shaft 12 and the body under test. The counterweight assembly 24 is comprised of a face plate 74 secured to a hub on the shaft 22 and exposed rearwardly through the opening in the cup-shaped enclosure 16 between the legs 14 of the tubular shaft assembly. The face plate 74 carries adjacent its periphery a pair of diametrically opposed bearings or bearing block assemblies 76 which serve to mount a shaft 78 in diametric intersecting relation to the shaft 22, the shaft 78 thus being mounted for rotation with the shaft 22 and for independent rotation about its own axis. To rigidify the assembly, a bracing strap or circular face plate 80 is secured to the bearing blocks 76 at the forward side of the counterweight assembly, whereby the shaft 22, the face plate 74, the blocks 76 and the plate 80 comprise a frame journalled coaxially on the shaft 12.

The shaft 78 is comprised of two axially separated portions comprising a first portion carrying a drive pinion 82 and a drive transmitting fork 84, and a second portion carrying a pin engaged with the driving fork 84 and biased away from the first portion by means of a spring 86 confined between the fork and said second portion. Said second portion of the shaft 78 is provided with a screw threaded part 88 with which is meshed a counterweight means comprising a tubular threaded portion 90, a combined weight and guide 92 slidably positioned between the plates 74 and 80 to be held against rotation with but to be guided for axial movement relative to the shaft 78 and the threaded portion 88 thereof. A pointer or indicator 94 is also associated with the members 90 and 92 for conjoint movement therewith, the pointer 94 being visible through slotted and/or transparent portions of the plate 74. Preferably, the plate 74 carries a scale member 96 bearing indicia for cooperation with the indicator 94 to indicate the amount of counterweight required to balance the rotating body under test. A compression spring 98 encircles the shaft 78 and is confined between the drive fork 84 and the tubular collar 90 of the counterweight normally to bias the counterweight in the direction radially outwardly on the shaft 78. Suitable abutments are provided in the counterweight assembly between the plates 74 and 80 to limit movement of the counterweight 90–94 to a radially inward position wherein its counterbalancing effect is zero and a radially outward position constituting the point of maximum effectiveness thereof, which in the preferred embodiment of the invention is about four ounces. The screw 88 is preferably so proportioned relative to the threaded follower 90 that the follower leaves the screw immediately adjacent the two end positions of the weight assembly so that efforts to move the counterweight beyond its respective limits of movement will be nullified and damage to the mechanism will be prevented.

For cooperation with the shaft 78 and the pinion 82, the enclosure portion 16 of the tubular shaft 12 is provided in the interior thereof with a concentric crown or ring gear 100 which is in mesh with the pinion 82 whereby relative progression or retrogression of the shaft 22 relative to the tubular shaft 12 will result not only in circumferential displacement of the counterweight 90–92–94 but will also result simultaneously in either an increase or a decrease in the counterbalancing effect of said counterweight. In other words, when either of the discs 70 and 72 is stopped, the counterweight and its frame will rotate relative to the shaft 12 and cause simultaneously a change in the circumferential position and a change in the counterbalancing effect of the counterweight relative to the tubular shaft and the body under test.

Considering the movement of the weight relative to the body under test, the weight will move in a generally spiral path so that the counterweight will successively pass into phase and diametrically out of phase with any unbalancing mass in the test body, the counterbalancing effect being continuously changed upon each successive orbit of the counterweight relative to the body. Thus, the body will be subject successively to relatively great vibration and relatively little vibration as the weight passes respectively into phase and diametrically out of phase with the unbalanced mass of the body. Assuming that the wheel or other body to be tested is out of balance and the device of the present invention is set into operation with the counterweight initially at zero effect, the disc 72 will be stopped by the operator to cause the weight to progress relative to the wheel, whereupon the weight would be moved in a spiral path of increasing diameter. As this movement occurs, the wheel will have a period of relatively violent vibration, periods of intermediate vibration and a period of reduced vibration, as may be ascertained by observance of the wheel or a portion of the vehicle on which the wheel is mounted, such as the vehicle bumper. The operator simply retains the disc 72 stopped until he observes upon cyclical recurrence of the periods of reduced vibration the fact that vibration has ceased, whereupon he simply releases the disc 72. The frictional resistance and inertia of the gears in the drive train will immediately cause the counterweight assembly to be driven conjointly with the tubular shaft 12 and the wheel so that the counterweight assembly retains its adjusted counterbalancing position relative to the wheel. Now, if the operator observes that the wheel is not perfectly balanced, as noted by the continuing vibration of the bumper for example, he may effectively add more counterweight by again stopping the disc 72 and permitting the counterweight to go through one more period of violent vibration and into its next successive balancing position to attain a more stable and satisfactory balance wherein vibration of the wheel is nil. If the operator discovers under these circumstances that he has added too much counterbalancing weight, he can subtract weight simply by releasing the disc 72 and stopping the disc 70 whereupon the weight will retrogress and move inwardly relative to the axis of rotation to increase its counterbalancing effect, whereby upon passage of the same through one or more of the periods of violent vibration, the weight may be returned to a perfect counterbalancing position.

In the preferred embodiment of the invention, in accordance with the preceding description, the reversing assembly 30 is such that the sun gear is either stopped or rotated at an absolute speed equal to twice the speed of rotation of the tubular shaft 12. Relative to the tubular shaft, the effect is that the sun bear is rotated in opposite directions at the same speed. In other words, with the wheel or other test body rotating clockwise at a speed of 1000 r.p.m., the effect is that the sun gear will be rotated either clockwise or counter-clockwise at a relative speed of 1000 r.p.m. The transmission assembly 26 is preferably comprised of an orbital gear 36 having 48 teeth, sun gears each having 12 teeth and planet gears each having 18 teeth, thereby to afford an epicyclic value of 5-to-1 in each cooperative assembly of sun gear, planet gear and orbital gear. I prefer to provide three such operative assemblies, whereby the total speed reduction of the transmission assembly is 125-to-1. As will be appreciated from the drawings, this very substantial speed reduction is accomplished in extremely limited space. Relative to the reduction, the sun gear 42b2 will be rotated at an absolute speed of .200 more or less than the speed of the shaft 12 and the body under test; the sun gear 42b1 will be rotated at a speed of .040 more or less than the speed of the body; and the fitting 44 and shaft 22 will be rotated at an absolute speed of .008 more or less than the speed of the body being tested. Thus, at a test speed of 1000 r.p.m., the counterweight 90–92–94 will orbit relative to the wheel at a speed of plus or minus 8 r.p.m. This relationship I find excellent for balancing automotive wheels to an extremely precise and readily controllable degree in a very short period of time.

The mating threads of the shaft 78 and the counterweight follower 90 and the relationship between the pinion 82 and the ring gear 100 are preferably such that the counterbalancing effect of the counterweight is varied about ¼ ounce during each revolution of the counterweight assembly relative to the tubular shaft 12. I find this arrangement to be entirely satisfactory for the balancing of automotive wheels, but the relationship can of course be changed upon appropriate design of the screw 88, the follower 90, the ring gear 100 and the pinion 82.

While I have illustrated a counterweight assembly wherein the counterbalancing effect thereof is changed by radial movement of a single counterweight, it will be appreciated by those skilled in the art that the present invention is equally applicable to that type of counterweight assembly wherein the counterbalancing effect is varied by circumferential movement of a pair of weights toward and away from one another, an example of which counterweight means is shown in my Patent 2,972,256.

To the extent thus far specifically described, the balancer of the present invention may be secured to a wheel and operated in much the same manner as previously conventional in the art, e.g., as shown in my said patent, with the exception of course that balancing is facilitated by performance of only two operations as opposed to the prior four, and the fact that performance of the operations cannot be confused in respect of indecision to adjust the position or amount of the weight, since both are simultaneously changed.

However, it is a particular object of the present invention to provide an improved balancer which does not require the complex securing means heretofore required in the art and which does not involve the inherent danger of the adapters used in prior art practices. To this end, I make the balancer of the present invention of relatively small diameter, equip the same with the handle 32 and provide a wheel engaging adapter 20 that may simply be abutted against a wheel and hand-held in such position during operation of the balancer.

In accordance with the present invention, the handle 32 is rotatably mounted on the extension 62 of the tubular shaft 12 and on the rearwardly extending free end portion of the control shaft 28. The handle preferably comprises a tubular member having reinforcing flange or block portions at the forward and rearward ends thereof. The handle is preferably mounted on the extension 62 and the shaft 28 by means of three ball bearing assemblies 102, two between the handle and the extension 62 and one between the handle and the shaft 28, thereby to assure free rotation of the handle relative to the tubular shaft 12 and the control shaft 28 so that the operator may hold the handle 32 without being subjected to frictional forces that might tend to twist the handle out of his hands. Also, the handle preferably is of such length that the operator may readily place both hands on the same, thereby to hold the balancer primarily in his left hand by engagement of the left hand with the forward end portion of the handle 32 and to utilize his right hand, disposed on the rearward portion of the handle, to guide the balancer and manipulate the manual control instrumentality 34.

The control instrumentality 34 preferably comprises a spring biased rockable or toggle button which is pivotally mounted intermediate its ends on a transverse pin 104 secured to the handle in the manner shown particularly in FIGURE 3. The button preferably includes a metallic or other wear-resisting upper surface and a pad of friction material exposed to the interior of the handle and having its opposite end portions aligned with the discs 70 and 72 on the shafts 28 and 68. The button 34 is preferably biased to a normal intermediate position wherein the same is spaced from both of the discs so that the discs and the respective elements controlled thereby are normally free to rotate, whereby the counterweight assembly will normally rotate conjointly with the tubular shaft 12. In use, the operator may depress either end of the button 34 by his thumb thereby selectively to engage either one (but not both) of the discs 70 and 72. Upon engagement of the friction pad with either disc, the disc will be stopped thereby to result in performance of the control functions and counterweight movements hereinbefore described.

For use in the balancing of automotive wheels, the adapter 20 of the present invention affords the particular advantage that only two adapters are required for substantially all of the vehicles in use today. Specifically, the wheels of most vehicles are attached to the brake drum by either four or five fasteners disposed at equal circumferential spacings in a circular pattern concentric with the axis of rotation of the wheel and spaced radially outwardly of the hub of the wheel assembly. By virtue of the present invention, two adapters, one for four fastener wheels and one for five fastener wheels, satisfy the practical requirements of operators of wheel balancing equipment. Since both adapters embody the same principles and have substantially the same construction, mode of operation and result, only the five-lug adapter is shown herein.

As shown in FIGURES 2 and 4, each adapter 20 comprises a cylindrical hub portion 110 having an outer diameter to fit snugly within the cylindrical extension 18 on the rotary assembly 10 and having an inner diameter and depth sufficient to accommodate reception therein of the hub of the wheel assembly. An integral annular flange 112 radiates outwardly from the forward end of the hub 110 and the same is provided on its forward face with a plurality of pairs of forwardly or axially projecting radially elongated ribs 114 which extend substantially from the inner margin to the outer margin of the annular flange 112. The ribs of each pair are disposed equal distances to opposite sides of and parallel to a radius of the flange 112, the radial center lines of the several pairs of ribs being disposed at equal circumferential spacings corresponding to the circumferential spacings of a five-lug or fastener wheel. Due to the generally radial elongation of the ribs, each pair of ribs is adapted to receive therebetween a respective fastener or lug of a five fastener wheel substantially irrespective of the diameter of the circle on which the fasteners are disposed, whereby the one adapter adapts the balancer of the present invention to all five fastener wheels.

To establish driving connection between the adapter and the balancer, the tubular extension 18 on the rotating member 10 is provided with a radially inwardly extending driving lug 116 and a spring pressed detent 118 adapted to enter, respectively, into an axially extending slot 120 and a detent hole 122 provided in the wall of the cylindrical hub portion 110 of the adapter. By virtue of the detent 118, the adapter is held to the balancer, but may nevertheless be quickly disassociated from the balancer and reassociated with the same, thereby to facilitate interchange of the four and five lug adapters. The radial driving stud 116 in cooperation with the slot 120 of course provides the driving connection between the adapter and the balancer.

In use, the operator simply abuts the adapter against the face of the vehicle wheel (after the wheel cover or disc has been removed and the wheel has been jacked-up to permit independent rotation of the same) with the hub of the wheel entering into the hub 110 of the adapter and with the fasteners of the wheel fitting between respective pairs of the ribs 114. The operator then holds the balancer by grasping the handle 32 with both hands, whereafter the operator may set the wheel to rotating by means of a conventional wheel spinner. As the wheel rotates, the fasteners thereof cause the adapter to rotate and thus effect rotation of all the balancer components except the handle 32. By appropriate manipulation of the button 34 in the manner previously described herein, the operator may change the circumferential position and the counterbalancing effect of the counterweight relative to the rotating wheel thereby to counterbalance any unbalance existing in the wheel. When a balanced condition is achieved, as revealed by a lack of vibration of the vehicle bumper, the operator releases the button 34 and while still holding onto the handle and retaining the balancer in engagement with the wheel brings the wheel to a stop. The scale plate 96 may then be viewed whereby the operator is advised by the direction of radial extension of the scale plate where to apply a counterweight, and is advised by the position of the indicator 94 relative to the scale plate 96 of the amount of counterweight to be added at this location.

In balancing automotive wheels with the above described apparatus, it has been ascertained that the relative looseness of fit of the wheel fasteners between the ribs 114 results in imparting shock or impact to the handle 32 and to the remainder of the balancer construction when the wheel is subject to rapid changes in speed, particularly upon engaging the spinner with the wheel to increase its speed and when engaging the spinner or spinner brake with the wheel to stop the wheel. I have found that by providing a rubber facing on the ribs this shock loading is cushioned to mitigate transmission of shock to the operator's hands. However, this rubber facing tends to wear out through repeated use of the balancer, and I have therefore provided means whereby a rubber facing may be quickly associated with the adapter and its ribs and may be quickly removed and/or replaced as required in service. Specifically, I provide a rubber or resilient facing member or mask 124 comprising a generally annular base portion complemental to the annular flange 112 and having slots therein complemental to and adapted for passage of the ribs 114; and integral hollow upstanding rib portions 126 exactly complementing and fitting over the ribs 114 thereby to provide a resilient cushion on each side of each rib. The upstanding portions 126 are preferably open at the radially outer ends thereof to facilitate attachment and detachment of the resilient mask. Should the operator encounter wheel fasteners of a size larger than will pass between the cushioned ribs, the mask 124 may be stripped from the adapter plate to accommodate entry of the wheel fasteners between the metal ribs. On the other hand, should the operator encounter a wheel with very small fasteners, clearance between the cushioned ribs and the fasteners may be mitigated by slipping cup-shaped plastic thread protectors, which are commercially available at very low cost, over the fasteners or lugs. By virtue of the cushioning means thus provided, the operator is relieved of disturbing influences due to transmitted shock and vibration, is able to do a finer balancing job, and is subject to less fatigue than might otherwise be the case.

From the foregoing description, it will now be apparent to those skilled in the art that I have provided an improved wheel balancer of rugged, economical, fully mechanical construction which derives power for the balancing function from the rotating wheel whereby an operator may quickly balance wheels with great facility and little fatigue. Moreover, the skill required of the operator is considerably less than was heretofore the case, since the operator need now operate only a single button in one direction or the other and observe the vibration of the test body to quickly attain a perfectly balanced condition. Accordingly, all of the objects and advantages of the invention have been shown herein to be attained in a convenient, practical and economical manner.

While I have illustrated and described what I regard to be the preferred embodiment of my invention, it will be appreciated that various changes, rearrangements and modifications may be made therein without departing from the scope of the invention, as defined by the appended claims.

I claim:
1. In a device for determining the position and amount of counterweight required to balance a body rotating about an axis, a carrier to be coupled to the body for rotation therewith about said axis, weight means guided by said carrier for change in the circumferential position and the centrifugal weight effect thereof relative to said carrier and the body, and a single weight moving assembly operatively associated with said weight means and said carrier and including means for simultaneously changing the circumferential position and the centrifugal weight effect of said weight means; said weight moving assembly further including a transmission assembly deriving input power from said carrier and transmitting it to said weight means for normally conjoint rotation of the two, said transmission assembly including reversing means comprising first and second selectively engageable and disengageable means operative when engaged for relatively increasing and decreasing the drive ratio of said transmission assembly and causing said weight means rotatively to progress and retrogress respectively relative to said carrier.

2. In a device for determining the position and amount of counterweight required to balance a body rotating about an axis, a carrier to be coupled to the body for rotation therewith about said axis, weight means guided by said carrier for change in the circumferential position and the centrifugal weight effect thereof relative to said carrier and the body, and a single weight moving assembly operatively associated with said weight means and said carrier and including means for simultaneously changing the circumferential position and the centrifugal weight effect of said weight means; said weight moving assembly further including a transmission assembly deriving input power from said carrier and transmitting it to said weight means normally for conjoint rotation of the two, said transmission assembly including reversing means comprising first and second selectively engageable and disengageable members operative when restrained against rotation for relatively increasing and decreasing the drive ratio of said transmission assembly and causing said weight means bodily to rotatively progress or retrogress respectively relative to said carrier, said transmission assembly including speed governing means limiting bodily progression and retrogression of said weight means to a few r.p.m. relative to said carrier, and manually operated interlocked means for selectively engaging and restraining either one but not both of said selectively engageable and disengageable members and for disengaging both said members.

3. In a tool for determining both the position and amount of counterweight required to balance a body rotating about an axis, a carrier, a handle rotatably supporting said carrier for rotation about said axis, means coupling said carrier to the body for rotation therewith about said axis, weight means mounted on said carrier and guided for simultaneous change in centrifugal weight effect and rotative progressive movement with respect to said axis whereby said weight means moves in a spiral path centered on said axis and at some point in the travel of said weight means it comes into counterbalance with any unbalance of said body, drive means compelling said weight means to follow said path, and means controlled by the operator for starting, stopping and reversing said drive means; said control means including a transmission assembly deriving input power from said carrier and transmitting it to said weight means normally for conjoint rotation of the two, said transmission assembly including reversing means comprising first and second selectively engageable and disengageable members operative when engaged for relatively increasing and decreasing the drive ratio of said transmission assembly and causing said weight means rotatively to progress and retrogress respectively relative to said carrier, and a three position manually operated control on said handle for engaging one of said engageable and disengageable members in one position thereof, disengaging both said members in a second position thereof and engaging the other of said members in the third position thereof thereby to start, stop and reverse said drive means.

4. In a device for determining the position and amount of counterweight required to balance a body rotating about an axis, a carrier to be coupled to the body for rotation therewith about said axis, weight means guided by said carrier for change in the circumferential position and the centrifugal weight effect thereof relative to said carrier and the body, and a single weight moving assembly operatively associated with said weight means and said carrier and including means for simultaneously changing the circumferential position and the centrifugal weight effect of said weight means; said weight moving assembly further including a transmission assembly having a power input member connected to said carrier, an output member connected to said weight means and a control member, a reversing assembly connected to said control member including first and second selectively engageable and disengageable members operative when engaged for causing said control member and thereupon said weight means to progress and retrogress respectively relative to said input member and said carrier, and a control instrumentality for selectively engaging either of said selectively engageable and disengageable members and for disengaging both said members.

5. In a tool for determining both the position and amount of counterweight required to balance a body rotating about an axis, a carrier, a handle rotatably supporting said carrier for rotation about said axis, means coupling said carrier to the body for rotation therewith about said axis, weight means mounted on said carrier and guided for simultaneous change in centrifugal weight effect and rotative progressive movement with respect to said axis whereby said weight means moves in a spiral path centered on said axis and at some point in the travel of said weight means it comes into counterbalance with any unbalance of the body, drive means compelling said weight means to follow said path, and means controlled by the operator for starting, stopping and reversing said drive means; said control means including a transmission assembly having a power input member connected to said carrier, an output member connected to said weight means and a control member, a reversing assembly including a power input derived from said carrier, an output connected to said control member, first and second selectively engageable and disengageable members operative when engaged for causing said control member to progress and retrogress respectively relative to said input member, and a manually operable control instrumentality on said handle for selectively engaging either of said selectively engageable and disengageable members and for disengaging both said members.

6. In a device for determining the position and amount of counterweight required to balance a body rotating about an axis, a carrier to be coupled to the body for rotation therewith about said axis, weight means guided by said carrier for change in the circumferential position and the centrifugal weight effect thereof relative to said carrier and the body, and a single weight moving assembly operatively associated with said weight means and said carrier and including means for simultaneously changing the circumferential position and the centrifugal weight effect of said weight means; said weight moving assembly further including transmission means between said carrier and said weight means comprising power input means connected to said carrier and a pair of output members engaged with said input means one of which is coupled to said weight means, and means for selectively mitigating rotation of each of said output members thereby to accommodate any one of (a) conjoint rotation of said carrier and said weight means, (b) rotation of said carrier relatively faster than said weight means and (c) rotation of said weight means relatively faster than said carrier, rotation of said weight means relative to said carrier simultaneously changing both the circumferential position and the centrifugal weight effect of said weight means relative to said carrier and the body so that a counterbalancing force effectively spirals about said axis relative to the body to facilitate balancing thereof.

7. In a tool for determining both the position and amount of counterweight required to balance a body rotating about an axis, a carrier, a handle rotatably supporting said carrier for rotation about said axis, means coupling said carrier to the body for rotation therewith about said axis, weight means mounted on said carrier and guided for simultaneous change in centrifugal weight effect and rotative progressive movement with respect to said axis whereby said weight means moves in a spiral path centered on said axis and at some point in the travel of said weight means it comes into counterbalance with any unbalance of the body, drive means compelling said weight means to follow said path, and means controlled by the operator for starting, stopping and reversing said drive means; said control means including power input means connected to said carrier, a pair of output members engaged with said input means one of which is coupled to said weight means, and a three position manually operated control on said handle for engaging one of said output members in one position thereof, disengaging both said output members in a second position thereof and engaging the other of said members in the third position thereof thereby to accommodate starting, stopping and reversing of said drive means in said first, second and third positions thereof, respectively.

8. In a device for determining the position and amount of counterweight required to balance a body rotating about an axis, a carrier to be coupled to the body for rotation therewith about said axis, weight means guided by said carrier for change in the circumferential position and the centrifugal weight effect thereof relative to said carrier and the body, and a single weight moving assembly operatively associated with said weight means and said carrier and including means for simultaneously changing the circumferential position and the centrifugal weight effect of said weight means; said weight moving assembly further including orbiting means driven by said carrier and journalled on an axis transverse to the axis of rotation of said carrier, and a pair of rotary members operatively connected to said weight means, said rotary members being journalled on the axis of rotation of said carrier to opposite sides of said orbiting means and engageable with said orbiting means, said rotary members including manually engageable portions extending axially beyond said carrier and said weight means in the direction away from the body for individually and selectively holding one or the other but not both of said rotary members against rotation while engaged with said orbiting means.

9. In a device for determining the position and amount of counterweight required to balance a body rotating about an axis, a carrier to be coupled to the body for rotation therewith about said axis, weight means guided by said carrier for change in the circumferential position and the centrifugal weight effect thereof relative to said carrier and the body, and a single weight moving assembly operatively associated with said weight means and said carrier and including means for simultaneously changing the circumferential position and the centrifugal weight effect of said weight means; said carrier including a coaxial tubular shaft and said weight means including a shaft journalled in said tubular shaft; said weight moving assembly further including opposed orbiting members driven by said carrier and journalled on said tubular shaft on an axis transverse to said shafts, a pair of opposed rotary members journalled on the axis of said shafts and engaging opposite sides of said orbiting members, one of said rotary members being operatively connected to said weight means shaft, a control member journalled on said tubular shaft at the end thereof opposite said carrier and said weight means for rotation relative to said shafts and said members, said rotary members including shaft means extending axially beyond the end of said tubular shaft and into said control member, and a three position control instrumentality on said control member releasing said rotary members in one position and restraining respective ones of said rotary members against rotation in respective ones of its other two positions.

10. In a device for determining the position and amount of counterweight required to balance a body rotating about an axis, a carrier to be coupled to the body for rotation therewith about said axis, weight means guided by said carrier for changing the circumferential position and the centrifugal weight effect thereof relative to said carrier and the body, and a single weight moving assembly operatively associated with said weight means and said carrier and including means for simultaneously changing the circumferential position and the centrifugal weight effect of said weight means; said carrier and said weight means including concentric relatively rotatable inner and outer shafts; said weight moving assembly further including a control shaft coaxial with said inner and outer shafts and journalled in said outer shaft, planetary gearing between said shafts comprising an orbital gear on the outer shaft, a sun gear on one and a planet gear on the other of said inner and control shafts, and interposed sun and planet gears including at least a planet gear meshed with said sun gear and orbital gear and a sun gear on the last-named planet gear meshed with the first-named planet gear, and a reversing assembly within the outer shaft including an orbital member journalled on an axis transverse to the shafts and a pair of rotary members on the axis of said shafts to opposite sides of said orbiting member one of which is connected to said control shaft, said rotary members including concentric shaft means extending axially beyond the end of said outer shaft opposite said carrier and individually engageable for selectively mitigating rotation of the same.

11. In a device for determining the position and amount of counterweight required to balance a body rotating about an axis, a carrier to be coupled to the body for rotation therewith about said axis, weight means guided by said carrier for change in the circumferential position and centrifugal weight effect thereof relative to said carrier and the body, and a single weight moving assembly operatively associated with said weight means and said carrier and including means for simultaneously changing the circumferential position and centrifugal weight effect of said weight means; said carrier and said weight means including concentric relatively rotatable inner and outer shafts; said weight moving assembly further including a control shaft coaxial with said inner and outer shafts and journalled in said outer shaft, a speed reducer within said outer shaft coupling said inner and control shafts, a reversing assembly within said outer shaft including power input means connected to said outer shaft and output and control members engageable with said power input means and respectively connected to and journalled on said control shaft, and operating means normally disengaged from said control shaft and control member and selectively engageable with each.

12. In a device for determining the position and amount of counterweight required to balance a body rotating about an axis, a carrier to be coupled to the body for rotation therewith about said axis, weight means guided by said carrier for change in the circumferential position and the centrifugal weight effect thereof relative to said carrier and the body, and a single weight moving assembly operatively associated with said weight means and said carrier and including means for simultaneously changing the circumferential position and the centrifugal weight effect of said weight means; said carrier including an elongate tubular shaft extending away from the body; said weight moving assembly further including a control shaft journalled coaxially in said tubular shaft, speed reducing means within said tubular shaft including an orbital gear on said tubular shaft, a planet gear on said weight means, a sun gear on said control shaft and planet and sun gears between the first-named planet and sun gears, reversing means within said tubular shaft including orbiting members journalled on said tubular shaft on an axis transverse to the shaft, output and control members engaged with opposite sides of said orbiting members and respectively secured to and journalled on said control shaft, and operator means on said control shaft and said control member for selectively engaging each.

13. In a portable hand tool for determining both the position and the amount of counterweight required to balance an automotive wheel rotating about an axis and having wheel fasteners arranged in a circle concentrically about said axis, a carrier, a handle journalled on said carrier to be grasped by the operator of the tool for rotatably supporting said carrier for rotation about said axis, means movably mounted on said carrier to indicate both the position and the amount of counterweight required to balance the wheel, means operable from said handle and controlled by the operator for starting, stopping and reversing the movement of said indicating means, and a clampless adapter fixed to the end of said carrier remote from said handle and having an end face forced into concentric abutting relation with the wheel by manual pressure exerted axially from said handle to obtain rotation of said carrier through power derived from the wheel without necessity for clamping the carrier to the wheel; said adapter comprising a plate disposed generally perpendicular to said axis and having a plurality of pairs of axially projecting radially elongated ribs arranged in an annular pattern concentrically about said axis, the pairs of ribs being disposed at equal circumferential spacings corresponding to circumferential spacings of the fasteners on the wheel, each pair of ribs being engageable to opposite sides of a respective fastener substantially irrespective of the diameter of the circle defined by the fasteners.

14. In a portable hand tool as set forth in claim 13, a detachable resilient mask complemental to and fitting over said adapter and said ribs for mitigating transmission of shock and vibration from the wheel to the tool.

15. In a portable hand tool for determining both the position and the amount of counterweight required to balance an automotive wheel rotating about an axis and having wheel fasteners arranged in a circle concentrically about said axis, a carrier, a handle journalled on said carrier to be grasped by the operator of the tool for rotatably supporting said carrier for rotation about said axis, means movably mounted on said carrier to indicate both the position and the amount of counterweight required to balance the wheel, means operable from said handle and controlled by the operator for starting, stopping and reversing the movement of said indicating means, and a clampless adapter fixed to the end of said carrier remote from said handle and having an end face forced into concentric abutting relation with the wheel by manual pressure exerted axially from said handle to obtain rotation of the carrier through power derived from the wheel without necessity for clamping the carrier to the wheel; said adapter comprising a sleeve concentric with and complemental to said carrier and mounted thereon, means releasably connecting said sleeve to the carrier and preventing relative rotation of the two, and an annular adapter plate radiating outwardly from said sleeve and having a plurality of pairs of axially projecting radially elongated ribs thereon, the pairs of ribs being disposed at equal circumferential spacings corresponding to the circumferential spacings of the fasteners on the wheel, each pair of ribs being engageable to opposite sides of a respective fastener substantially irrespective of the diameter of the circle defined by the fasteners.

16. A portable hand-held device for balancing automotive wheels having wheel fasteners arranged in a circle concentrically about the wheel axis, comprising a pair of concentric relatively rotatable shafts, an adapter at one end of the outer one of said shafts, said adapter comprising a plate having a plurality of pairs of axially projecting radially elongated ribs arranged in an annular pattern concentrically about the axis of said shafts, the pairs of ribs being disposed at equal circumferential spacings corresponding to the circumferential spacings of the fasteners on the wheel, each pair of ribs being engageable to opposite sides of a respective fastener substantially irrespective of the diameter of the circle defined by the fasteners, counterweight means conjointly rotatable with and carried by the inner one of said shafts adjacent said adapter, motion transmitting means disposed between and coupling the outer shaft and said counterweight means for changing its centrifugal weight effect upon relative rotation of said shafts and thus simultaneously with change in its circumferential position relative to the outer shaft, a change speed transmission within the outer shaft including a power input connected to the outer shaft, a power output connected to the inner shaft and a speed control, a reversing assembly within the outer shaft including a pair of selectively engageable and disengageable members coupled to said speed control and operative when engaged to cause rotative progression and retrogression respectively of the inner shaft relative to the outer shaft, a handle projecting beyond the opposite ends of said shafts and journalled on one of said shafts for accommodating rotation relative thereto of both of said shafts, and a unitary control on said handle for selectively engaging either one of said members and for disengaging both of said members, said handle being of a length to accommodate both hands of an operator and said adapter accommodating operative engagement of the outer shaft with the wheel for conjoint rotation therewith while the device is hand-held by the operator without necessity for physically clamping the device to the wheel.

References Cited by the Examiner
UNITED STATES PATENTS

| | | | |
|---|---|---|---|
| 2,739,482 | 3/56 | Reiser et al. | 73—458 |
| 2,779,196 | 1/57 | Hemmeter | 73—458 |
| 2,929,598 | 3/60 | Pierce | 73—458 X |
| 2,972,256 | 2/61 | MacMillan | 73—458 |
| 3,010,323 | 11/61 | Reiser | 73—469 |

RICHARD C. QUEISSER, *Primary Examiner.*
ROBERT EVANS, *Examiner.*